United States Patent
Zollitsch et al.

(10) Patent No.: US 10,507,989 B2
(45) Date of Patent: Dec. 17, 2019

(54) APPARATUS FOR THE AUTOMATED REMOVAL OF WORKPIECES ARRANGED IN A BIN

(71) Applicant: Liebherr-Verzahntechnik GmbH, Kempten (DE)

(72) Inventors: Markus Zollitsch, Haldenwang (DE); David Haenschke, Altusried (DE); Bernhard Riedmiller, Wertach (DE); Thomas Mattern, Rieden (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 0 days.

(21) Appl. No.: 15/876,012

(22) Filed: Jan. 19, 2018

(65) Prior Publication Data
US 2018/0208409 A1    Jul. 26, 2018

(30) Foreign Application Priority Data

Jan. 20, 2017   (DE) .................. 10 2017 000 524

(51) Int. Cl.
*B65G 47/90*    (2006.01)
*B65G 47/14*    (2006.01)
(Continued)

(52) U.S. Cl.
CPC .......... *B65G 47/905* (2013.01); *B25J 9/0084* (2013.01); *B25J 9/0093* (2013.01); *B25J 9/0096* (2013.01);
(Continued)

(58) Field of Classification Search
CPC .... B07C 5/02; B65G 47/1478; B65G 47/905; B25J 9/1679
See application file for complete search history.

(56) References Cited

U.S. PATENT DOCUMENTS 4,412,293 A * 10/1983 Kelley ................. B25J 15/0266
                                                      414/730
5,314,055 A *  5/1994 Gordon ................. B25J 9/1697
                                                      198/395
(Continued)

FOREIGN PATENT DOCUMENTS

DE    102013013114 A1    2/2014
DE    102012012988 A1    4/2014
(Continued)

OTHER PUBLICATIONS

Grieve, T. et al., "3D Force Prediction Using Fingernail Imaging with Automated Calibration," Proceedings of the 2010 IEEE Haptics Symposium, Mar. 25, 2010, Waltham, Massachusetts, 8 pages.
(Continued)

*Primary Examiner* — Thomas Randazzo
(74) *Attorney, Agent, or Firm* — McCoy Russell LLP

(57) ABSTRACT

The present disclosure shows an apparatus for the automated removal of workpieces arranged in a bin, said apparatus having a first object recognition device for detecting the workpieces in the bin; a first picker for picking and removing the workpieces from the bin; a controller for evaluating the data of the first object recognition device, for path planning and for controlling the first picker; a buffering station on which the first picker places the workpieces after the removal from the bin and a positioning apparatus that more accurately positions and/or isolates the workpieces starting from the buffering station. Provision is made that the buffering station has at least one tiltable placement area that is tiltable into a slanted position via a tilting mechanism.

17 Claims, 6 Drawing Sheets

(51) Int. Cl.
*B25J 9/16* (2006.01)
*B65G 47/96* (2006.01)
*B25J 9/00* (2006.01)
*B25J 19/02* (2006.01)

(52) U.S. Cl.
CPC ........... *B25J 9/1612* (2013.01); *B25J 9/1664* (2013.01); *B25J 9/1679* (2013.01); *B25J 9/1697* (2013.01); *B25J 19/023* (2013.01); *B65G 47/1478* (2013.01); *B65G 47/96* (2013.01); *B65G 2201/02* (2013.01); *Y10S 901/09* (2013.01); *Y10S 901/47* (2013.01)

(56) References Cited

U.S. PATENT DOCUMENTS

| | | | |
|---|---|---|---|
| 9,002,507 B2 | 4/2015 | Mattern et al. | |
| 9,289,897 B2* | 3/2016 | Mattern | B25J 9/1612 |
| 9,302,396 B2 | 4/2016 | Mattern et al. | |
| 9,469,035 B2* | 10/2016 | Noda | B25J 9/0018 |
| 9,492,926 B2 | 11/2016 | Mattern et al. | |
| 9,827,676 B2 | 11/2017 | Mattern et al. | |
| 9,855,659 B2 | 1/2018 | Mundt et al. | |
| 2014/0017048 A1* | 1/2014 | Mattern | B25J 9/1612 414/567 |
| 2014/0147240 A1* | 5/2014 | Noda | B25J 9/0018 414/751.1 |
| 2014/0365009 A1 | 12/2014 | Wettels | |
| 2015/0346708 A1 | 12/2015 | Mattern et al. | |
| 2015/0352717 A1* | 12/2015 | Mundt | B25J 9/1664 414/730 |
| 2017/0369244 A1* | 12/2017 | Battles | B65G 1/137 |

FOREIGN PATENT DOCUMENTS

| | | | | |
|---|---|---|---|---|
| DE | 102012013022 A1 | 4/2014 | | |
| DE | 102012013023 A1 | 4/2014 | | |
| DE | 102012013029 A1 | 4/2014 | | |
| DE | 102012013030 A1 | 4/2014 | | |
| DE | 102012013031 A1 | 4/2014 | | |
| DE | 112012002677 T5 | 4/2014 | | |
| DE | 102014008107 A1 | 12/2015 | | |
| DE | 102014008108 A1 | 12/2015 | | |
| DE | 102014008444 A1 | 12/2015 | | |
| EP | 2578365 A2 * | 4/2013 | ........... B25J 9/1687 |
| EP | 2679352 A1 | 1/2014 | | |
| EP | 2698234 A2 | 2/2014 | | |
| EP | 2876067 A1 | 5/2015 | | |
| JP | H09239682 A | 9/1997 | | |
| JP | 2010120141 A | 6/2010 | | |
| JP | 2011000685 A | 1/2011 | | |

OTHER PUBLICATIONS

Mattern, T. et al., "Apparatus for the Automated Removal of Workpieces Arranged in a Bin," U.S. Appl. No. 15/876,041, filed Jan. 19, 2018, 29 pages.

* cited by examiner

APPARATUS FOR THE AUTOMATED REMOVAL OF WORKPIECES ARRANGED IN A BIN

CROSS REFERENCE TO RELATED APPLICATION

This application claims priority to German Patent Application No. 10 2017 000 524.9, entitled "Apparatus for the Automated Removal of Workpieces Arranged in a Bin," filed Jan. 20, 2017, the entire contents of which is hereby incorporated by reference in its entirety for all purposes.

TECHNICAL FIELD

The present disclosure relates to an apparatus for the automated removal of workpieces arranged in a bin, said apparatus comprising a first object recognition device for detecting the workpieces in the bin, a first picker for picking and removing the workpieces from the bin, and a controller for evaluating the data of the first object recognition device, for path planning and for controlling the first picker.

BACKGROUND AND SUMMARY

Such apparatus have become known under the name "random bin picking" and in particular serve the equipping of production plant with workpieces that are supplied in an unordered manner in a bin. Such apparatus are known, for example, from the documents DE102014008444A1, DE102014008108A1, DE102014008107A1, DE102013013114A1, DE102012013031A1, DE102012013030A1, DE102012013029A1, DE102012013023A1, DE102012013022A1 and DE102012012988A1 of the same applicant.

The picking of workpieces from a bin represents a complex object. It has in particular proved to be difficult to ensure both a complete emptying of the bins and an exact placement of the workpieces on the desired end placement area. It is therefore known from the above-named prior art to use a buffering station on which the first picker places the workpieces after the removal from the bin. A positioning apparatus, for example in the form of a second picker, is then used to position the workpieces more precisely and/or to isolate them starting from the buffering station.

DE 102012012988A1 thus shows a buffering station having a slanted plane on which the first picker configured as a magnetic picker drops the workpieces picked from the bin. The workpieces slide from there to a transport path that transports the workpieces to a removal region. A second object recognition device is provided there that again detects the workpieces on the transport path so that the second picker used as a positioning apparatus can pick them and arrange them on the end placement area more accurately. The transport belt has a circulation region and an expulsion region. DE 102012012988A1 mentions that alternatively to the design shown in the embodiment a buffering station can be used that has a turntable as a transport device.

It is the object of the present disclosure to further improve the known apparatus for the automated removal of workpieces arranged in a bin.

This object is achieved by an apparatus for automated removal of workpieces arranged in a bin, having a first object recognition device for detecting the workpieces in the bin; a first picker for picking and removing the workpieces from the bin; a controller for evaluating data of the first object recognition device, for path planning and for controlling the first picker; a buffering station on which the first picker places the workpieces after the removal from the bin; and a positioning apparatus that positions and/or isolates the workpieces, starting from the buffering station, wherein the buffering station has at least one tiltable placement area that is tiltable into a slanted position via a tilting mechanism; by an apparatus having a first object recognition device for detecting the workpieces in the bin; a first picker for picking and removing the workpieces from the bin; a controller for evaluating the data of the first object recognition device, for path planning and for controlling the first picker; a buffering station on which the first picker places the workpieces after the removal from the bin, with the intermediate station comprising a transport device that transports the workpieces from a placement region into a removal region; a positioning apparatus that positions and/or isolates the workpieces, starting from the buffering station; and a second object recognition device for detecting the workpieces on the transport device, wherein the second object recognition device has a light source for illuminating the workpiece, with the second object recognition device having a casing that reduces the incidence of scattered light onto the workpiece from the outside; and by an apparatus for the automated removal of workpieces arranged in a bin, in particular in accordance with one of the preceding claims, having a first object recognition device for detecting the workpieces in the bin; a first picker for picking and removing the workpieces from the bin; a controller for evaluating the data of the first object recognition device, for path planning and for controlling the first picker; a buffering station on which the first picker places the workpieces after the removal from the bin, with the intermediate station comprising a turntable that transports the workpieces from a placement region into a removal region; a positioning apparatus that positions and/or isolates the workpieces, starting from the buffering station; and a second object recognition device for detecting the workpieces on the turntable, wherein the second object recognition device is arranged above the turntable such that, on a movement from the placement region into a removal region, a workpiece moves into a detection region where it is detected by the second object recognition device before it is moved further toward the removal region by rotation of the turntable. Further advantageous embodiments of the present invention form the subject of the dependent claims.

In a first aspect, the present disclosure comprises an apparatus for the automated removal of workpieces arranged in a bin, said apparatus having a first object recognition device for detecting the workpieces in the bin, a first picker for picking and removing the workpieces from the bin, and a controller for evaluating the data of the first object recognition device, for path planning and for controlling the first picker. The apparatus further has a buffering station on which the first picker places the workpieces after the removal from the bin and it has a positioning apparatus that more accurately positions and/or isolates the workpieces starting from the buffering station. In accordance with the present disclosure, provision is made in accordance with the first aspect that the buffering station has at least one tillable placement area that is tiltable into a slanted position via a tilting mechanism. In accordance with the first aspect of the present disclosure, the placement area can therefore be used to place workpieces on the placement area. It is furthermore possible by the tilting capability to bring the placement area into a slanted position. This allows new deployment options. The placement area may form a slanted plane for this purpose in the slanted position into which it can be tilted.

In an embodiment, the placement area has a first position in which it is aligned substantially horizontally and it has the second slanted position, wherein the placement area can be tilted by the tilting mechanism from the first position into the second position and/or from the second position into the first position. The tilting mechanism optionally has a drive via which the placement area can be tilted. A pneumatic or hydraulic cylinder and/or a linear drive can be used, for example. The placement area may have a horizontal tilt axis about which it can be tilted.

In an embodiment of the present disclosure, the tiltable placement area is configured such that a workpiece placed on the tiltable placement area slides from the tiltable placement area due to the tilting. This can, for example, be used to isolate and/or sort workpieces. The workpiece can slide from the tiltable placement area onto a further region of the buffering station.

The tiltable placement area can have an open edge that is at the bottom in the slanted position such that workpieces can slide over this edge without impediment. The placement area can furthermore have an upwardly projecting margin in lateral regions adjoining the open edge, said margin preventing workpieces from sliding off the placement area there.

In a possible embodiment of the present disclosure, the buffering station has a transport device that transports the workpieces from a placement region into a removal region. Due to the spatial separation of the placement region and of the removal region, it becomes simpler to allow the first picker that serves for the placement and the positioning apparatus that serves for removing the workpieces from the buffering station to work in parallel with and/or independently of one another.

In an optional embodiment of the present disclosure, the transport device is a turntable.

In a first variant of the first aspect, the tiltable placement area is arranged such that a workpiece placed on the tiltable placement area slides onto the transport device by tilting the tiltable placement area. The tiltable placement area can therefore in particular be used for isolation.

The apparatus may have a sensor that recognizes whether more than one workpiece is picked. The controller is in particular configured such that it controls the picker when more than one picked workpiece was detected such that the workpieces are placed on the tiltable placement area and slide onto the transport device by tilting the placement area. If more than one workpiece was picked, it is typically because the workpiece picked by the picker has got caught by another workpiece. The sliding from the placement area onto the transport device supports the release of such a caught arrangement. A light barrier can be used as the sensor, for example, that determines whether the picked workpiece ends at a defined spacing from the first picker. If the workpiece does not end at the defined spacing, a conclusion is drawn that more than one workpiece has been picked.

The controller may be configured such that, when only one workpiece has been picked, it is placed directly on the transport device. If only one workpiece has been picked, the tiltable placement area is therefore not required.

As already described above, the transport device may be a turntable so that in the first variant a workpiece slides from the tiltable placement area onto a placement area of the turntable.

In a second variant of the first aspect, the tiltable placement area is arranged at the transport device. In an optional embodiment, the transport device has a plurality of separately tiltable placement areas.

The tiltable placement area may in particular be arranged at a turntable, with the turntable having a plurality of separately tiltable placement areas.

All the placement areas of the transport device can in particular be configured as tiltable. If it is a turntable, a plurality of placement areas may be provided that are each separately tiltable, with all of the placement areas optionally being tiltable.

A tiltable placement area in accordance with the present disclosure can be used for expelling defective and/or surplus and/or caught workpieces. A placement area arranged at the transport device can in particular serve the expulsion of defective and/or surplus and/or caught workpieces. Optionally, however, a bitable placement area arranged at the transport device can also be used for the expulsion.

The apparatus in accordance with the present disclosure optionally has an expulsion apparatus that is arranged such that a workpiece placed on the tiltable placement area slides to the expulsion apparatus by tilting the placement area.

The expulsion apparatus can be a drawer in a possible embodiment. The drawer may be operated from outside a protective enclosure of the apparatus. This allows expelled workpieces to be manually removed from the apparatus without the plant having to be stopped for this purpose.

The expulsion apparatus may be arranged beneath the transport device such that a workpiece located on this placement area slides into the expulsion apparatus by tilting a placement area arranged at the transport device.

The apparatus in accordance with the present disclosure can have a plurality of tiltable placement areas.

The first and second variants of the first aspect of the present disclosure can optionally be combined with one another. A first tiltable placement area can in particular be provided, with workpieces placed on the first tiltable placement area sliding onto the transport device by tilting. A second tiltable placement area can furthermore be provided that is arranged at the transport device. Workpieces may be expelled by tilting the second tiltable placement area.

In a second independent aspect, the present disclosure comprises an apparatus for the automated removal of workpieces arranged in a bin, said apparatus having a first object recognition device for detecting the workpieces in the bin, a first picker for picking and removing the workpieces from the bin, and a controller for evaluating the data of the first object recognition device, for path planning and for controlling the first picker. A buffering station is furthermore provided on which the first picker places the workpieces after the removal from the bin, with the buffering station comprising a transport device that transports the workpieces from a placement region in a removal region. A positioning apparatus is furthermore provided that more accurately positions and/or isolates the workpieces, starting from the buffering station, and a second object recognition device for detecting the workpieces on the transport device. In accordance with the second aspect, the second object recognition device has a light source for illuminating the workpiece. Such a light source allows a substantially improved object detection that is independent of the environmental light.

The second object recognition device may have a casing that reduces the incidence of scattered light from outside onto the workpiece. The casing therefore allows an improved object detection by the second object recognition device since it is ensured that the workpieces are always detected under the same light conditions.

The casing particularly may extend from a sensor of the second object recognition device that is arranged at a first spacing from a placement area of the transport device toward the transport device. A supply region and a discharge region remain open between the casing and the placement area of the transport device that allow the supply and discharge of workpieces on the transport device into the region of the casing. The casing allows the sensor to be arranged at a spacing particularly suitable for the detection and nevertheless to control the light conditions in the detection region.

The casing may end in the supply region and in the discharge region at a second spacing from the placement area of the transport device that amounts to less than 50% of the first spacing. The second spacing optionally amounts to less than 20% of the first spacing. The casing therefore ends substantially closer to the placement area of the transport device than the sensor is arranged with respect to it.

The casing may form a housing open toward the transport device.

The sensor may be arranged above the transport device and the side walls of the casing extend downwardly from above toward the transport device.

The light source of the second object recognition device may be arranged in or at the casing.

In a third aspect, the present disclosure comprises an apparatus for the automated removal of workpieces arranged in a bin, said apparatus having a first object recognition device for detecting the workpieces in the bin, a first picker for picking and removing the workpieces from the bin, and a controller for evaluating the data of the first object recognition device, for path planning and for controlling the first picker. The apparatus furthermore has a buffering station on which the first picker places the workpieces after the removal from the bin, with the buffering station comprising a turntable that transports the workpieces from a placement region in a removal region. A positioning apparatus is furthermore provided that more accurately positions and/or isolates the workpieces, starting from the buffering station, and a second object recognition device for detecting the workpieces on the turntable. In accordance with the third aspect, the second object recognition device is arranged above the turntable such that, on a movement from the placement region into a removal region, a workpiece moves into a detection region where it is detected by the second object recognition device before it is moved further toward the removal region by rotation of the turntable. In accordance with the present disclosure, not only the placement and the removal of the workpieces therefore take place, but additionally also the detection of the workpieces in regions spatially separate from one another. The spatially separate detection has the advantage that no account has to be taken of the working region of the positioning apparatus during the detection. Despite the spatially separate detection of the workpieces, the position of the workpieces is also exactly known in the removal region due to the turntable and said position can therefore be used for the exact control of the positioning apparatus.

The turntable may work in a cycle and may have at least three rotational positions, with a placement of the turntable being arranged in the placement region in the first rotational position of the turntable, in the detection region in the second rotational position, and in the removal region in the third rotational position. A workpiece that was placed on the placement area in a first cycle therefore moves into the detection region where it is detected in a later cycle and into the removal region in an even later cycle where it is removed from the turntable by the positioning apparatus.

The placement of a workpiece on the turntable may take place by the first picker, the detection of a workpiece on the turntable by the second object detection device, and the picking back up of the workpiece from the turntable by the positioning apparatus with a respectively stationary turntable. The stationary turntable allows a particularly exact procedure.

The turntable optionally has at least three placement areas, with a second placement area being in the detection region and a third placement area being in the removal region whenever a first placement area is arranged in the placement region. This allows a parallel operation in all three regions.

In the third aspect, the individual placement areas of the turntable do not have to be physically separated from one another. In an example embodiment, the turntable may simply have a round physical placement area that is only divided into different placement areas by the controller with a cycled mode of operation. The placement areas are, in contrast, may be designed as separate table elements that can further be tilted separately from one another.

There may respectively simultaneously takes place: a placement of a first workpiece on the turntable by the first picker, a detection of a second workpiece on the turntable by the second object recognition device, and a picking back up again of a third workpiece from the turntable by the positioning apparatus.

The turntable can have exactly three placement areas in an example embodiment and/or the three steps of placement, detection, and picking back up can take place in three consecutive cycles. In alternative embodiments, the turntable can, however, have more than three placement areas that can, for example, be used as additional storage.

The apparatus in accordance with the first, second, and third aspects of the present disclosure are each subject matters of the present application independently of one another. However, the first and second aspects may be combined with one another, and/or the second and third aspects may be combined with one another, and/or the first and third aspects may be combined with one another. Optionally, all three aspects are may be combined with one another.

On a combination of the second and third aspects, the casing is may be arranged in the detection region, with the placement areas of the turntable each being able to be traveled beneath the casing by rotation of the turntable.

On a combination of the second and first aspects, the bitable placement may be arranged and/or arrangeable beneath the casing. An expulsion can hereby take place immediately by tilting the placement area when a defective part and/or an incorrect number of parts and/or caught parts are detected by the second object recognition device. The expulsion apparatus may be arranged such that, by tilting a tiltable placement area arranged beneath the casing, the workpieces arranged on this placement area slide into the expulsion apparatus. The whole base surface of the tiltable placement area is further optionally located beneath the casing, with the side walls of the casing optionally enabling a tilting of the placement area within the casing.

On a combination of the third and first aspects, the placement areas of the turntable may be tiltable. The expulsion apparatus may be arranged such that, by tilting a tiltable placement area arranged in the detection region, the workpieces arranged on this placement area slide into the expulsion apparatus. An expulsion can hereby take place immediately by tilting the placement area when a defective part and/or an incorrect number of parts and/or caught parts are detected by the second object recognition device.

Example embodiments of the present disclosure that can be used in apparatus in accordance with each of the above-descried aspects will be described in more detail in the following.

In a possible embodiment of the present disclosure, the positioning apparatus can pick up the workpieces from the buffering station and can place them on a second buffering station and/or on an end placement area. The second buffering station can, for example, be used to change the orientation of the workpieces again and/or to carry out worksteps at the workpieces. The end placement area can in particular be a transport device that supplies the workpieces to processing and/or assembly.

The positioning apparatus may be used to pick up the workpieces from the buffering station and to selectively place them on the second buffering station and on the end placement area.

A second object recognition device may be provided that determines the orientation of the workpiece on the buffering station. The controller may decide whether a workpiece moves directly to the end placement area or first to the second buffering station on the basis of the data of the second object recognition device.

Provision can furthermore be made that the second buffering station is a repicking location that allows a picking of the workpiece with a changed orientation relative to the picker.

If a workpiece is already in a position on the buffering station that allows a picking with a desired alignment, it can be placed directly on the end placement area by the positioning apparatus. If it is, in contrast, recognized that the workpiece is disposed on the buffering position such that it cannot be placed on the end placement area as desired, it is first taken to the second buffering station where it is again picked with a changed orientation relative to the picker before it is placed on the end placement area. This procedure may be repeated automatically by the controller. Both the placement and the picking up from the second buffering station may take place by the positioning apparatus.

The first object recognition device may be a 3D sensor. The first object recognition device can in particular comprise a laser scanner. Since the workpieces are typically arranged in a plurality of layers and in an unordered manner in the bin, 3D information is required for a successful picking.

The second object recognition device, in contrast, may optionally comprise a 2D sensor. A 3D sensor can in particular be dispensed with in the second object recognition device since the workpieces are already arranged in isolation and at a defined level. An apparatus in accordance with the second and third aspects additionally simplifies the detection and therefore also enables a secure operation of the positioning apparatus by means of a 2D detection. The 2D sensor can in particular be a camera sensor.

The positioning apparatus may comprise a picker for removing the workpieces from the buffering station. In a possible embodiment, the first picker can also be used as a positioning apparatus, i.e. both the placing on the buffering station and the picking up from the buffering station takes place by the first picker. The picker of the positioning apparatus may optionally be a second picker.

The first and/or second pickers is/may be moved by a picker arm. It can be a robot arm of a 6-axis robot or a picker arm arranged at a surface portal or at a linear portal. The first and second pickers can be arranged at the same picker arm. The first and second pickers, however, may optionally each be arranged separately at a first or at a second picker arm.

In a possible embodiment of the present disclosure, a plurality of bins with workpieces from which the first picker can pick workpieces can be arranged in the working region of the first picker. A supply arrangement having at least two supply regions arranged next to one another for bins can in particular be provided. The supply arrangement therefore permits the supply of a plurality of bins into the working region of the first picker.

The supply arrangement may permit the exchange of an empty first bin while a second bin is simultaneously emptied by the first picker. Alternatively or additionally, the apparatus can permit the selective removal of workpieces from two bins.

The first object recognition device may be moved over each of the bins and/or supply regions by means of a travel arrangement. This permits workpieces to be detected in each of the bins with only a first object recognition device.

A separation apparatus can furthermore be provided via which the supply regions can be individually separated from the working region of the first picker. This allows a bin to be changed while the apparatus removes workpieces from another bin. A hood can in particular be provided as the separation apparatus that can be moved over one of the bins and/or one of the supply regions.

At least three supply regions may be provided. This permits, on the one hand, workpieces to be removed from two bins in parallel, with the third supply region being used to replace empty bins with full bins.

In an example embodiment, the apparatus in accordance with the present disclosure is configured such that a plurality of different workpieces can be handled next to one another. Workpieces may be removed from at least two bins in parallel. Further, at least two different end placement areas and/or two transport paths may be provided for transporting the different workpieces away.

In addition to the apparatus in accordance with the present disclosure, the present disclosure further comprises corresponding buffering stations such as were described above for the apparatus in accordance with the first, second and third aspects.

The present disclosure will now be explained in more detail with reference to embodiments and to drawings.

DETAILED DESCRIPTION

FIGS. 1 to 8B show an embodiment of an apparatus in accordance with the present disclosure in which all the aspects of the present disclosure have been implemented in combination. The implementation of the individual aspects shown in the embodiment can, however, respectively be used independently of the combination shown and therefore also respectively per se forms an independent aspect of the present disclosure.

Figure 1:
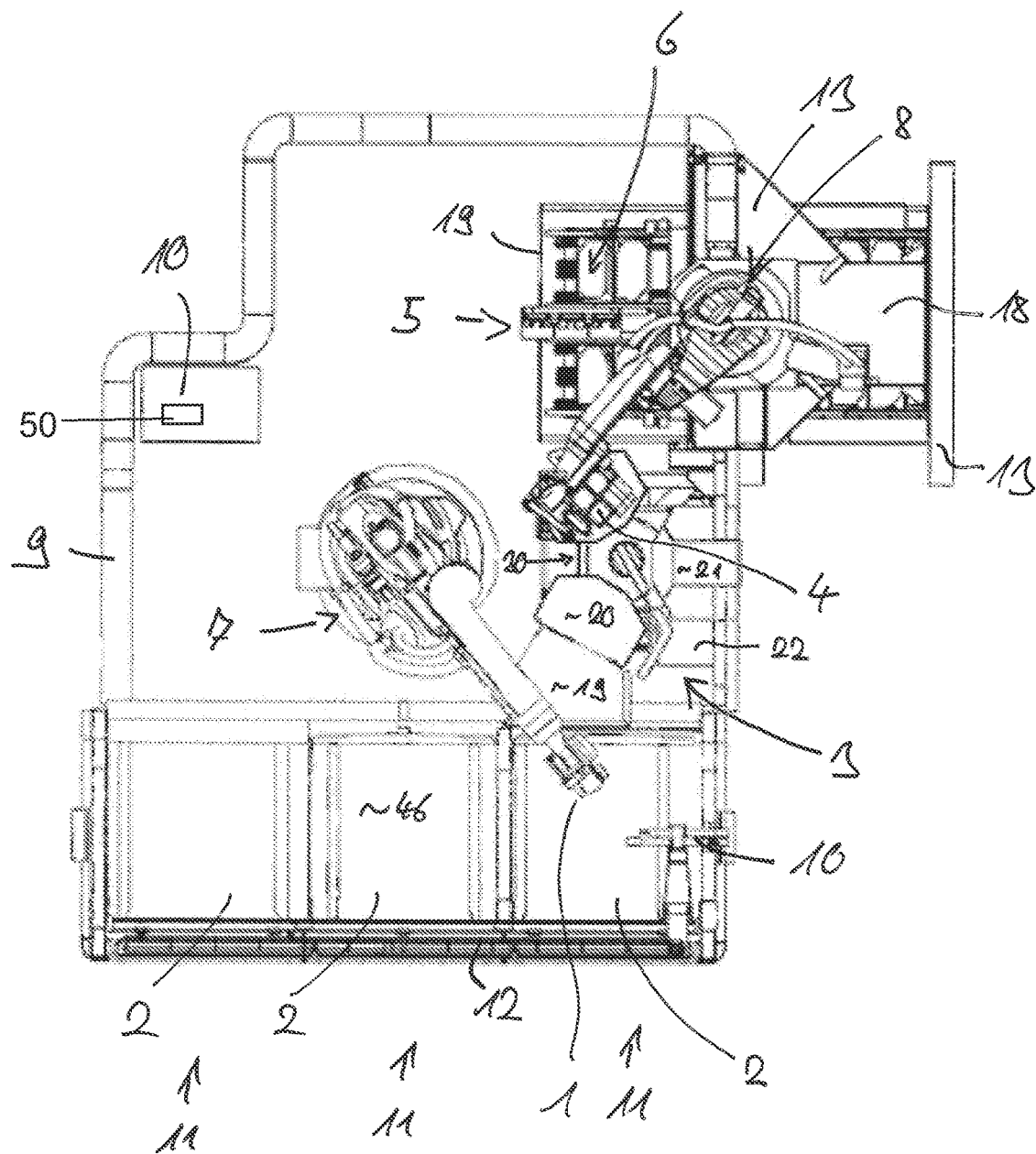
FIG. 1 shows an embodiment of an apparatus in accordance with the present disclosure in a plan view.
Figure 2:
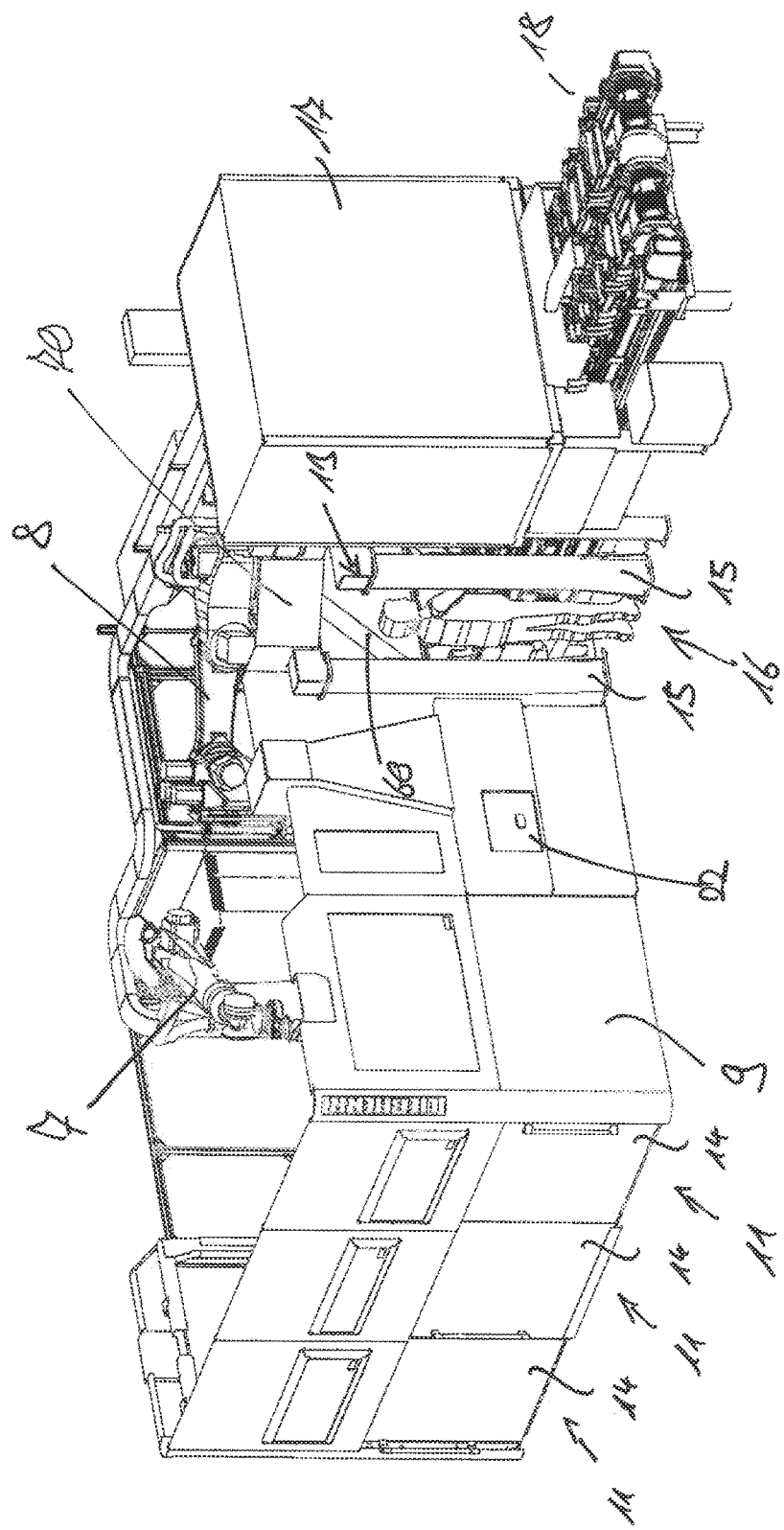
FIG. 2 shows the embodiment of FIG. 1 in a perspective view obliquely from above.
Figure 3:
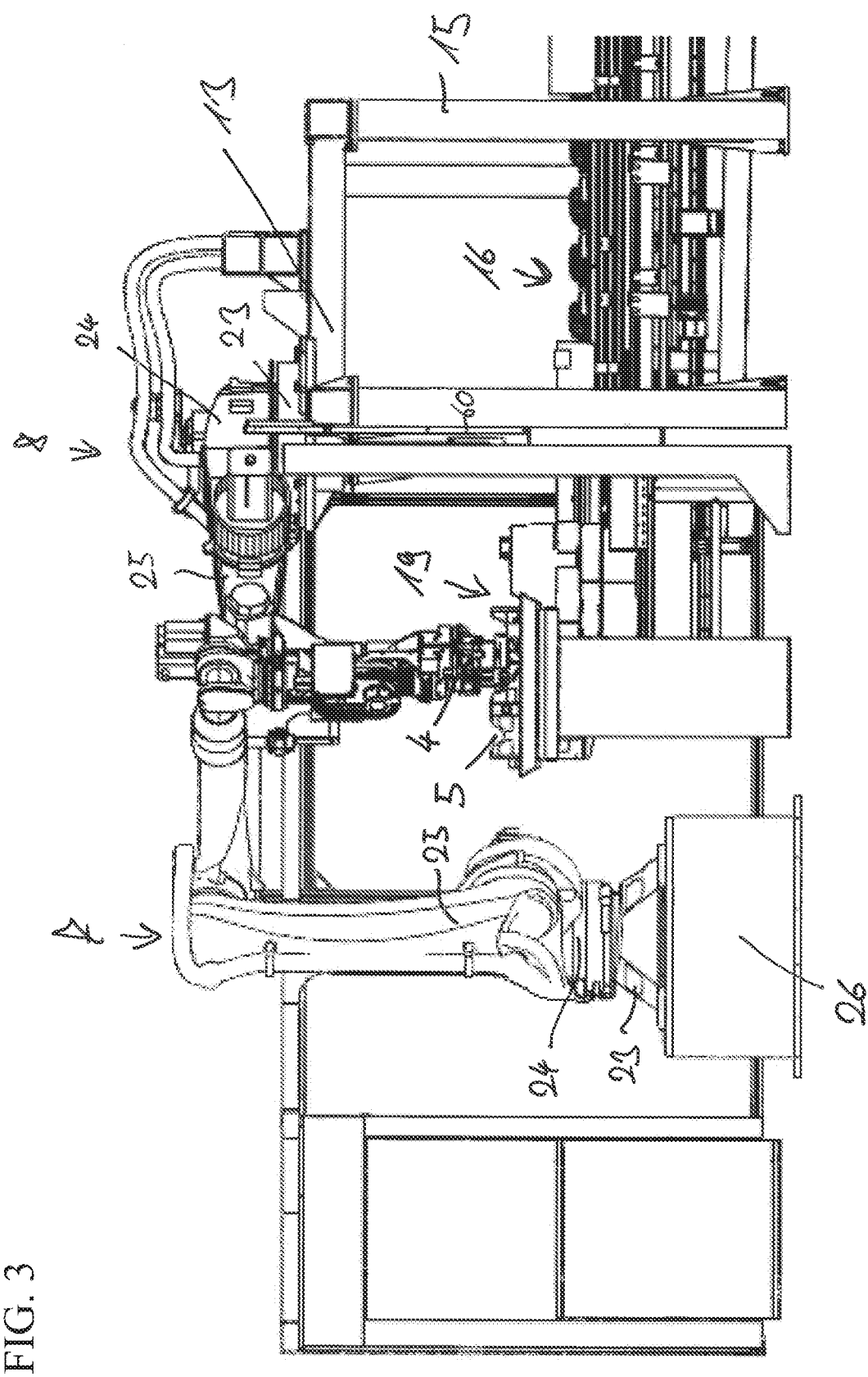
FIG. 3 shows the embodiment of FIG. 1 in a side view in which the protective enclosure has been partly removed.

The embodiment of the apparatus in accordance with the present disclosure shown in FIGS. 1 to 3 has a first picker 1 which is used to pick workpieces from the bins 2. Workpieces can be provided in an ordered or unordered form in the bins 2.

An object recognition device 10 is furthermore provided that detects workpieces present in the bins 2. The apparatus has a controller that evaluates the data of the object recognition device 10, that carries out a path planning to control the picker, and that controls the picker using this path planning to remove the workpieces from the bin 2. The controller is arranged in a control cabinet 10 in the embodiment.

In the embodiment shown in FIGS. 1 to 3, the first picker 1 is arranged at a robot arm 7 and is moved by it. The robot arm is in particular a 6-axis industrial robot with a plurality of actuators or drives communicating with an electronic controller 10 having instructions stored therein for carrying out the actions described herein based on sensor 50 and other parameters. Alternatively, the first picker could also be arranged at a surface portal or linear portal and can be moved via it. The first picker 1 may be arranged above a picking arm element at the first robot arm 7 or above the surface portal or linear portal that has one or more further axes of movement to ensure a complete emptying of the bin. The picking arm element can in particular have a pivot axis and an axis of rotation. The picking arm element or the arrangement and embodiment of the first picker 1 can in particular take place such as is known from DE102013013114 A1. The first picker is a mechanical picker in the embodiment.

In the embodiments shown in the Figures, a plurality of bins 2 can be arranged in the working region of the first picker 1. For this purpose, a supply arrangement having three supply regions 11 is provided into which a respective bin can be introduced. As can be recognized in FIG. 2, the protective enclosure 9 of the apparatus has respective doors 14 for this purpose via which the bins can be introduced into and removed from the supply regions. A separation arrangement is furthermore provided in the form of a displaceable hood 46 that can be selectively arranged above one of the three supply regions. The separation arrangement separates the respective supply region from the working region of the picker 1 so that a bin 2 arranged in the separated supply region can be replaced without stopping the operation of the apparatus. Two respective supply regions are open toward the working region of the picker thanks to the use of three supply regions. This makes it possible to empty two bins having different workpieces in parallel, for example.

The object detection unit 10 in the embodiment has a sensor that is movable at a travel arrangement 12 and that can hereby be arranged above each of the bins or supply regions. Only a first object recognition unit 10 is hereby necessary to detect workpieces in each of the bins.

The bins can, for example, be metal boxes or lattice boxes. The apparatus shown in the embodiment can be used with three bins that each comprise identical workpieces or with two or three bins having different workpieces.

The object detection of the workpieces in the bin by the first object recognition device 10, the path planning, and the control of the first picker, as well as the embodiment of the first object recognition device can take place as is known from DE 102012012988 A1. The embodiment and the operation of the supply unit can take place as is known from DE 102014008108 A1.

The apparatus can also have only one or two supply regions and/or only one bin that is arranged in the working region of the first picker.

The apparatus shown in FIGS. 1 to 3 has a first buffering station 3 on which the workpieces removed from one of the bins 2 by the first picker 1 can be placed to be isolated and/or to be picked again with higher precision from there. A positioning apparatus in the form of a second picker 4 is provided that receives the workpieces from the buffering station. The second picker 4 is arranged at a second robot arm 8 in the embodiment. In alternative embodiments, the second picker 4 could also be arranged at a surface portal or linear portal. The second picker is a mechanical picker in the embodiment. Further alternatively, the same picker could be used both for placing the workpieces on the buffering station and for picking the workpieces back up from the buffering station.

The buffering station 3 in the embodiment has a placement region in which the workpieces are placed by the first picker 1 and a removal region which is spatially separate therefrom and in which the workpieces are removed by the second picker 4. A transport device is provided that transports the workpieces on the buffering station from the placement region to the removal region. A second object recognition device 21 is furthermore provided that detects the workpieces on the transport device. In the embodiment, the buffering station has a detection region for this purpose that is spatially separate from the placement region and from the removal region.

The picking back up of the workpieces from the buffering station takes place by a second picker 4 that is arranged at a second robot arm 8. It is used to place workpieces on a transport device 6. The transport device 6 in the embodiment comprises a transport belt on which nests for the workpieces are arranged as end placement areas and the workpieces are placed into said nests. Any other transport devices would, however, also be conceivable here.

Figure 4:
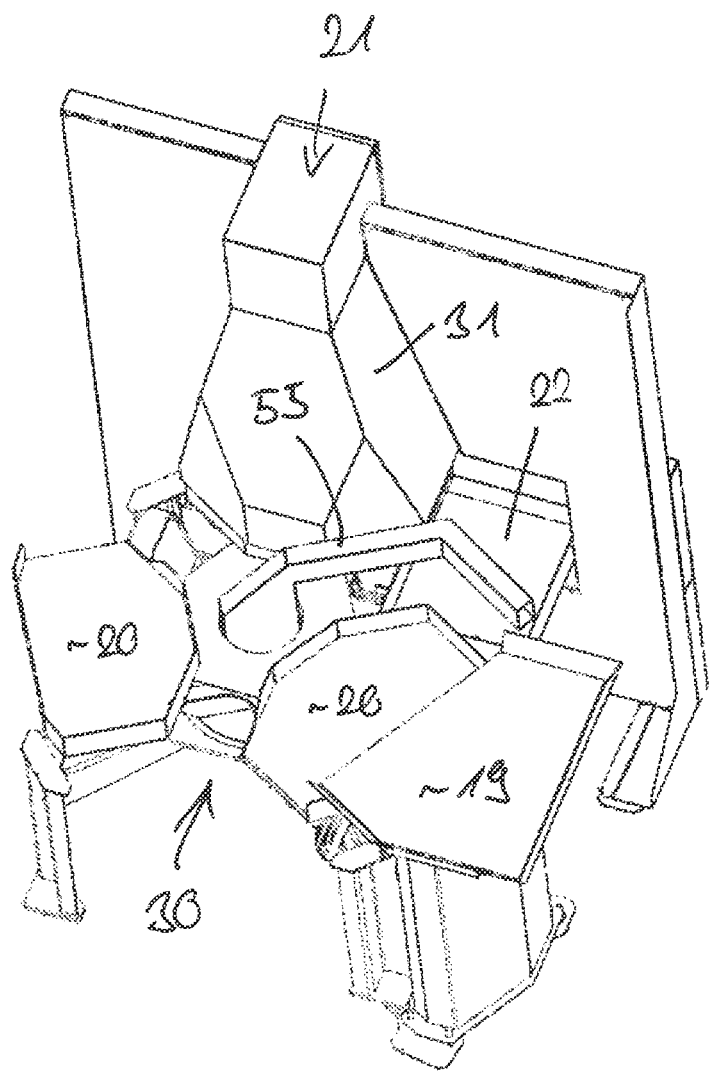
FIG. 4 shows the embodiment of a buffering station used in the embodiment of FIG. 1.
Figure 5:
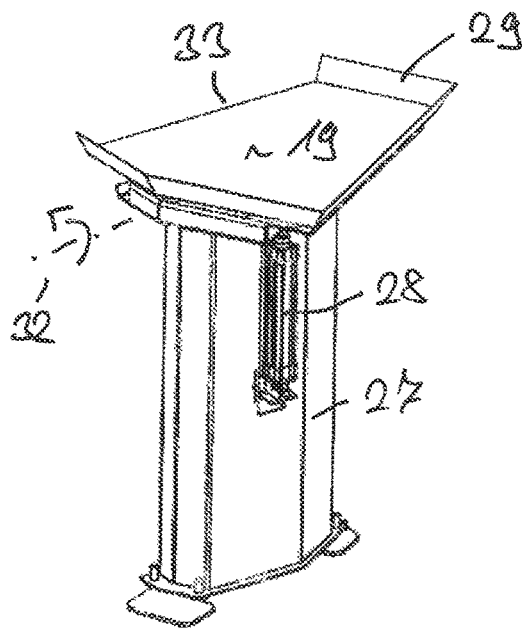
FIG. 5 shows an embodiment of a tiltable placement area such as is used in the embodiment of a buffering station in accordance with FIG. 4.
Figure 6:
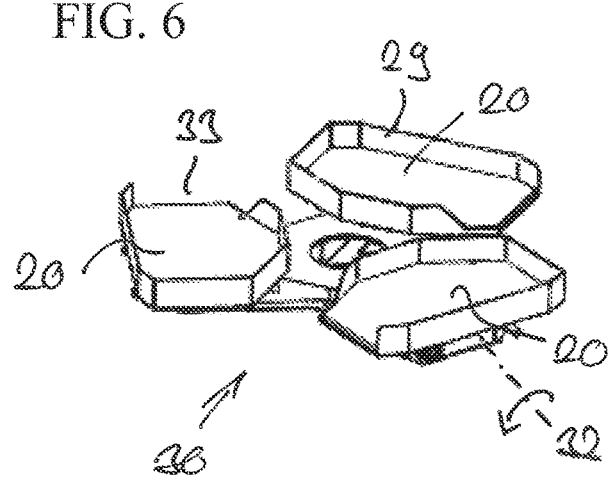
FIG. 6 shows an embodiment of a turntable such as is used in the embodiment of a buffering station shown in FIG. 4.
Figure 7:
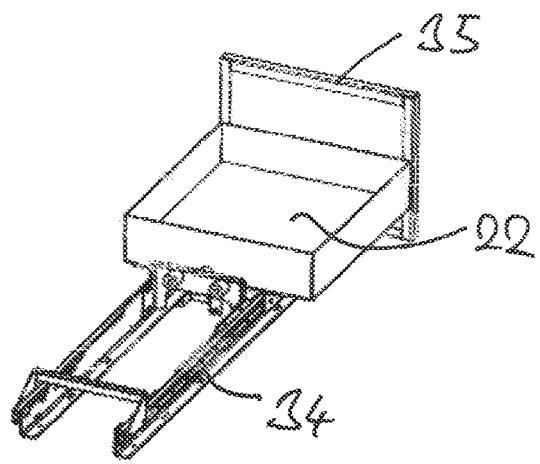
FIG. 7 shows an embodiment of an expulsion station in accordance with the present disclosure such as is used in the embodiment of a buffering station shown in FIG. 4.

An embodiment of the buffering station in accordance with the present disclosure is shown in FIG. 4; components of this buffering station are shown in FIGS. 5, 6, and 7. The buffering station implements a plurality of aspects of the present disclosure in combination.

In accordance with an aspect, the buffering station as a transport device has a turntable 30 having a plurality of placement areas 20. The placement areas are respectively moved from the placement region via the detection region to the removal region by rotating the turntable. A workpiece placed on a placement area in the placement region is therefore first moved to the second object recognition device 21, is detected there, and is removed by the second picker 4 after a further rotation of the turntable in the removal region.

If a first placement area of the turntable is located in the placement region, a second placement area is simultaneously located in the detection region and a third placement area is located in the removal region. The apparatus works in a cycled manner so that with a respectively stationary turntable, a first workpiece is placed in the placement region, a second workpiece is simultaneously detected in the detection region and a third workpiece is simultaneously removed in the removal region. The turntable is then rotated so that the respective workpieces move into the respective next region, whereupon corresponding worksteps are again carried out in all three regions simultaneously.

In the embodiment, three placement areas 20 are provided that are arranged at an angular interval of 120 degrees at the turntable 30. The turntable is rotated by 120 degrees after each work cycle.

In alternative embodiments of the present disclosure, the turntable could also have a larger number of placement areas or rotational positions. Further alternatively, the placement areas also do not have to be physically separated from one another, but could rather be configured as annular placement areas, for example.

In accordance with a further aspect of the present disclosure, the second object recognition device 21 has an enclosure 31 that reaches from a sensor arranged in the upper region of the enclosure down to the transport device. The second object recognition device furthermore has a light source for illuminating the workpieces. A uniform illumination of the workpieces independent of ambient light is possible in the detection region by the enclosure 31 and the separate light source. A 2D sensor may be used as the sensor, for example a camera sensor.

The enclosure 31 in the embodiment is designed as a housing only open toward the transport device. Each of the placement areas 20 can be moved beneath the enclosure 31 by rotation of the turntable. The total base surface of a placement area 20 may be located beneath the enclosure 31 once it has been rotated into the detection region.

At least in a supply and discharge region, the edges of the enclosure 31 do not completely reach up to the plane of the placement areas 20 to enable the supply of workpieces arranged on the placement areas 20. If the placement areas 20, as shown in the embodiment, however, have upwardly projecting marginal regions 29, they can substantially reach up to the lower edge of the enclosure 31. The sensor within the enclosure is in contrast substantially further away from the placement area 20 than the lower edges of the enclosure. The spacing between the sensor and the placement area can in particular be at least twice as large and optionally at least 5 times as large as the spacing between the lower edge of the enclosure in the region of the supply and discharge region and the placement area 20.

In accordance with a further aspect of the present disclosure, the buffering station has tiltable placement areas.

In the embodiment, the placement areas 20 of the turntable are configured as tiltable placement areas. A tilting of the placement areas 20 can be used to expel workpieces.

The expulsion can take place in that a placement area 20 of the turntable located in the detection region is tilted. The enclosure 31 may be configured such that it permits a tilting of the placement area 20 in its interior. The lower edge of the enclosure 31 may be arranged outside a base surface of the placement area 20 located in the detection region so that said placement area can tilt into the enclosure.

Starting from the placement area 20, the workpieces slide into an expulsion apparatus 21 by which the workpieces can be manually removed from the apparatus.

In the embodiment, a table 27 is furthermore provided that has a tiltable placement area 19. It is arranged next to the transport device. In the embodiment, it is located between the bin and the turntable.

The controller is configured such that the first picker only places a picked workpiece on the tiltable placement area 19 when an incorrect number of workpieces is picked, in particular when more than one workpiece has been picked. This can in particular take place when another workpiece has caught the picked workpiece such that it is also lifted up by the first picker. This can be detected by a light barrier, for example, that detects the spacing of the first picker from the light barrier at which a workpiece breaks through the light barrier. If this spacing does not correspond to the spacing that would be expected on the picking of only one workpiece, the controller assumes a picking of a plurality of workpieces and places them on the placement area 19. If only one workpiece is picked, it is placed directly onto a placement area 20 of the transport device.

If workpieces are placed on the placement area 19, it is brought into a slanted position by tilting and thus forms a slide from which the workpieces slide onto a placement area of the transport device of the buffering station; in the embodiment, onto a placement area 20 of the turntable that is located in the placement region.

The workpieces that slid onto the placement area are brought into the detection region by a subsequent movement of the transport device, by rotation of the turntable in the embodiment, and it is detected in said detection region by means of the second object recognition unit whether actually too many workpieces are disposed on the placement area 20 of the turntable. If the second object recognition device 21 confirms that too many workpieces are disposed on the placement area 20, they are expelled by means of a tilting of the placement area 20.

The mechanical design of the table 27 is shown in more detail in FIG. 5. It has a pedestal on which the placement area 19 is arranged tiltable about a horizontal axis of rotation 32. A pneumatic cylinder 28 arranged between the pedestal and the placement area 19 is used for the tilting.

The more detailed configuration of the tiltable placement areas 20 arranged at the turntable 30 is shown in more detail in FIG. 6. They are respectively arranged via a horizontal axis of rotation 32 at the turntable 30, with the tilting taking place via pneumatic cylinders that cannot be recognized.

Different drives, in particular different linear drives, could naturally also be used as the drive for tilting.

The tiltable placement areas 19 and 20 each have a planar placement area and an open edge 33 which is located at the bottom in the tilted state and over which the workpieces slide from the placement area. In the remaining marginal regions, the placement areas in contrast have upwardly projecting margins 29 that prevent workpieces from accidentally sliding from the placement areas in these regions.

The embodiment of the expulsion apparatus is shown in more detail in FIG. 7. It is a drawer 22 in this embodiment that is arranged beneath the turntable such that the workpieces that are located on a tiltable placement area 20 that is located in the detection region slide into the drawer 22 by tilting said placement area. The drawer 22 can be moved over rails 34 and is accessible from the outside of the protective enclosure 9 of the apparatus.

The front 35 of the drawer 22 forms a part of the protective enclosure 9 of the apparatus for this purpose. As can be recognized in FIG. 2, the drawer 22 can hereby be operated from outside the protective enclosure of the apparatus to manually remove expelled workpieces.

The buffering station has the protective arrangement 55 shown in FIG. 4 that separates the region of the drawer from the working region of the first picker and therefore enables a removal of the workpieces from the drawer without interruption of the work of the apparatus.

In accordance with a further aspect of the present disclosure which can be seen from FIGS. 1 to 3, the second robot arm 8 which is used for placing the workpieces on the transport device 6 is arranged on a pedestal 13 beneath which the transport device 6 extends.

The transport device has a placement region 19 that extends from the region of the pedestal next to the pedestal.

The placement region 19 of the transport device 6 is therefore easily accessible for the second picker 4 or for the second robot arm 8.

As can in particular be recognized from FIG. 2, a handling station 16 is provided beneath the pedestal 13 and can be used for a manual handling of the workpiece on the transport device. An extremely space-saving design can be produced, on the one hand, from the arrangement of the second robot arm 8 on the pedestal 13. On the other hand, the station 16 is largely separated from the working region of the robot arm 8 or of the second picker by the pedestal 13.

The pedestal 13 in the embodiments has a plurality of supports 15 that in turn support a platform on which the second robot arm 8 is arranged. The transport path of the station 16 that extends beneath the pedestal between the supports is accessible from the outside between two supports 15. The placement region 19 and the station 16 are additionally separated from one another beneath the plane of the pedestal via a strut 60 of the pedestal beneath which strut the transport device 6 travels.

A protective wall 70 that separates the working region of the second robot arm from the station is located above the station 16.

The second robot arm 8 has a base 23 that is arranged on the pedestal 13. A first element 24 of the robot arm is rotatably arranged on the base 23 via a vertical axis of rotation. The first element 24 has a horizontal pivot axis via which a first arm segment 25 is arranged at the first element. The robot arm 8 can be designed, for example, as a normal 6-axis industrial robot.

As can be recognized in FIG. 3, the first robot arm 7 can also have a design such as has just been described with regard to the second robot arm. In the embodiment, the base 23 of the first robot arm is likewise on a pedestal 26 which, however, is lower than the pedestal 23 on which the second robot arm 8 is arranged.

In the embodiment, the base 23 of the second robot arm 8 is arranged at the end of the pedestal 13 facing the placement region 19 and is therefore located above the region that separates the placement region 19 from the handling region 16 of the station.

Workpieces placed on the transport device 6 in the placement region are first traveled into the handling region or in the region of the station 16 and are traveled onward from there into a region 18 of the transport device located outside the apparatus.

As can be seen in FIG. 2, a processing station 17 can be arranged at the outlet of the apparatus and can be used, for example, to mark the workpieces, for example via a laser marking.

In the embodiment, the apparatus is adapted for a parallel handling of two different workpieces. For this purpose, the transport device 6 has two separate parallel transport paths having correspondingly different nests.

The apparatus in accordance with the present disclosure further has a second buffering station 5 that is configured as a repicking station. The workpieces have to be placed on the transport device 6 with a specific orientation, which in turn requires a specific alignment between the two pickers 4 and the workpieces. Such an orientation is only possible on the picking up of the workpieces from the first buffering station 3 when the workpieces have already been arranged with the correct orientation over a first placement area of the first buffering station. Such already correctly oriented workpieces are directly placed onto the transport device from the first buffering station.

Workpieces that are arranged on the first buffering station with an incorrect orientation are in contrast first placed on the second buffering station by the second picker 4 and are there picked again with a changed orientation between the workpiece and the picker in order then to be placed on the transport device 6 from the second buffering station.

The orientation of the workpieces on the buffering station is determined via the second object recognition device 21, with the controller controlling the second picker 4 on the basis of data of the second object recognition device 21 corresponding to the procedure presented above.

Figure 8A:
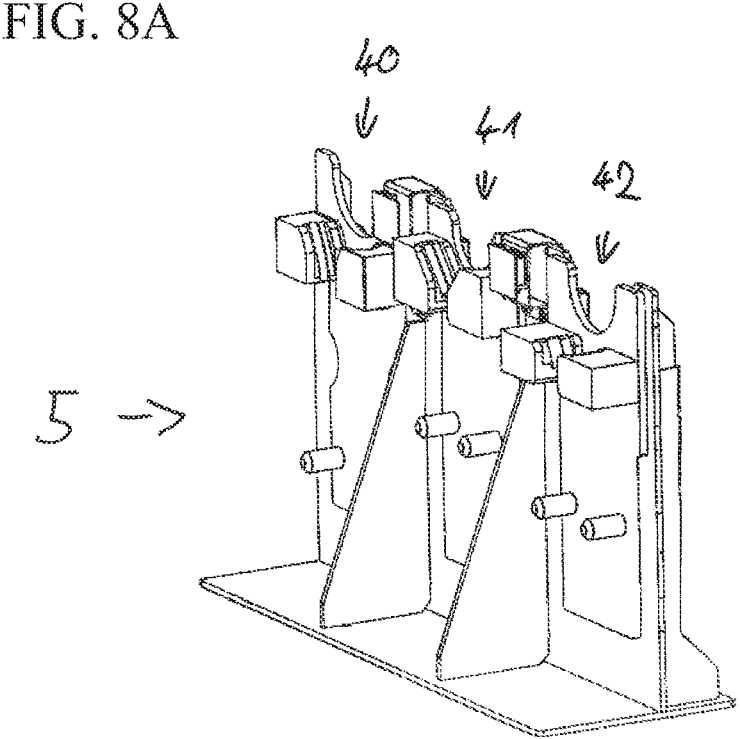
FIG. 8A shows a perspective view of a second buffering station.
Figure 8B:
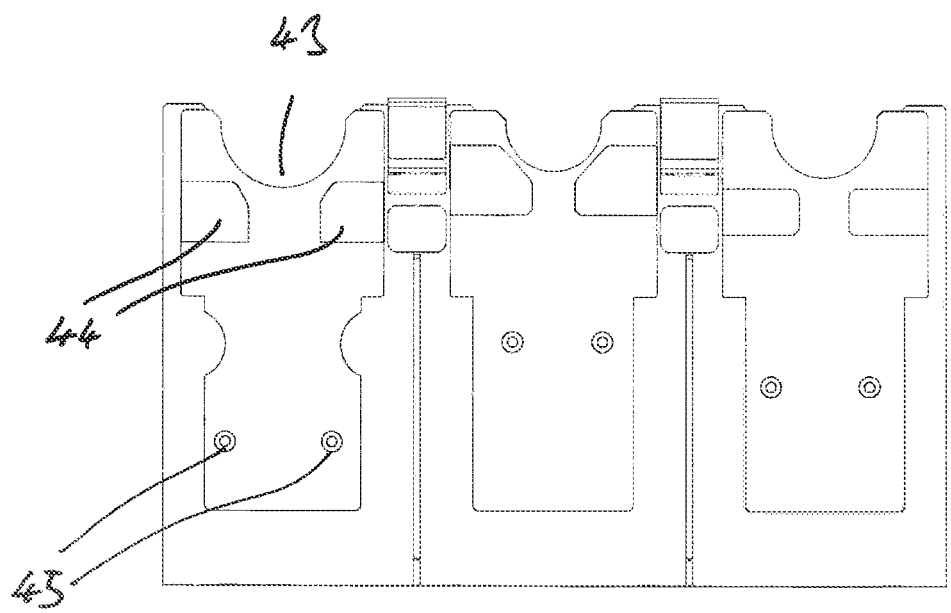
FIG. 8B shows a side view of a second buffering station.

An embodiment for a repicking station usable as a second buffering station is shown in FIGS. 8A and 8B, with three separate repicking locations 40, 41, and 42 for three different workpieces being present here. Since the workpieces to be handled here are con rods, blocks 44 are provided on which the con rod head comes to lie as well as pins 45 that limit the position of the con rod. An annular cut-out 43 is provided in the upper region so that a repeat picking from the other side through the con rod eye is possible. In other embodiments of the workpiece, differently designed repicking locations would naturally be used.

In the above-described embodiment, the second picker 4 or the second robot arm 8 was used to pick workpieces from a first buffering station. In alternative embodiments of the present disclosure, the second robot arm 8 could, however, also be used directly to pick workpieces from a bin and to place them on the transport device 6 and/or on the second buffering station. In this case, the first buffering station and/or the first picker could be dispensed with. The second picker is then arranged at the second picker arm 8 via a picking arm element having one or more additional axes of movement, in particular via a picking arm element such as was described above with regard to the first picker.

The individual aspects of the present disclosure that were shown in more detail with respect to the embodiment can also in another respect be used, also per se in each case, and without the other aspects in accordance with the present disclosure.

The specific embodiments that were described with reference to the embodiment for the individual aspects can in particular also each be used independently of the remaining aspects and their embodiment.

The invention claimed is:

1. An apparatus for automated removal of workpieces arranged in a bin,
    having a first object recognition device for detecting the workpieces in the bin;
    a first picker for picking and removing the workpieces from the bin;
    a controller for evaluating data of the first object recognition device, for path planning and for controlling the first picker;
    a buffering station on which the first picker places the workpieces after the removal from the bin; and
    a positioning apparatus that positions and/or isolates the workpieces, starting from the buffering station,
    wherein the buffering station has at least one tiltable placement area that is tiltable into a slanted position via a tilting mechanism,
    wherein the buffering station comprises a transport device that transports the workpieces from a placement region to a removal region where the workpieces are positioned and/or isolated by the positioning apparatus,
    wherein the tiltable placement area is arranged at the transport device; wherein the transport device has a plurality of separately tiltable placement areas.

2. The apparatus in accordance with claim 1, wherein the tiltable placement area is arranged at a turntable; and wherein the turntable has a plurality of separately tiltable placement areas.

3. An apparatus for automated removal of workpieces arranged in a bin,
having a first object recognition device for detecting the workpieces in the bin;
a first picker for picking and removing the workpieces from the bin;
a controller for evaluating data of the first object recognition device, for path planning and for controlling the first picker;
a buffering station on which the first picker places the workpieces after the removal from the bin; and
a positioning apparatus that positions and/or isolates the workpieces, starting from the buffering station, wherein the buffering station has at least one tiltable placement area that is tiltable into a slanted position via a tilting mechanism,
wherein the buffering station comprises a transport device that transports the workpieces from a placement region to a removal region where the workpieces are positioned and/or isolated by the positioning apparatus,
wherein the tiltable placement area is arranged such that a workpiece placed on the tiltable placement area slides onto the transport device by tilting the tiltable placement area; wherein the apparatus has a sensor that recognizes whether more than one workpiece has been picked; and wherein the controller controls the first picker when more than one picked workpiece was detected such that the workpieces are placed on the tiltable placement surface and slide onto the transport device by tilting the placement area.

4. An apparatus for automated removal of workpieces arranged in a bin,
having a first object recognition device for detecting the workpieces in the bin;
a first picker for picking and removing the workpieces from the bin;
a controller for evaluating data of the first object recognition device, for path planning and for controlling the first picker;
a buffering station on which the first picker places the workpieces after the removal from the bin wherein the buffering station has at least one tiltable placement area that is tiltable into a slanted position via a tilting mechanism;
a positioning apparatus that positions and/or isolates the workpieces, starting from the buffering station, and
an expulsion apparatus that is arranged such that a workpiece placed on the tiltable placement area slides to the expulsion apparatus by tilting the placement area; wherein the expulsion apparatus is a drawer; and wherein the drawer is operated from outside a protective enclosure of the apparatus.

5. The apparatus in accordance with claim 4, wherein the tiltable placement area is configured such that a workpiece placed on the tiltable placement area slides off the tiltable placement area due to the tilting.

6. The apparatus in accordance with claim 4, wherein the buffering station comprises a transport device that transports the workpieces from a placement region into a removal region.

7. The apparatus in accordance with claim 6, wherein the transport device is a turntable.

8. The apparatus in accordance with claim 4, wherein the positioning apparatus picks up the workpieces from the buffering station and places them on a second buffering station and/or on an end placement area; wherein the positioning apparatus is used to pick up the workpieces from the buffering station and to selectively place them on the second buffering station and on the end placement area; wherein a second object recognition device is provided that determines an orientation of the workpiece on the buffering station; and wherein the controller decides with reference to the data of the second object recognition device whether a workpiece moves directly to the end placement area or first to the second buffering station.

9. The apparatus in accordance with claim 8, and/or wherein the second buffering station is a repicking location that permits a picking of the workpiece with a changed orientation relative to the first picker.

10. The apparatus in accordance with claim 9, wherein the placing of a first workpiece on the turntable by the picker, the detection of a second workpiece on the turntable by the second object recognition device, and the picking back up again of a third workpiece from the turntable by the positioning apparatus takes place simultaneously.

11. An apparatus for the automated removal of workpieces arranged in a bin,
having a first object recognition device for detecting the workpieces in the bin;
a first picker for picking and removing the workpieces from the bin;
a controller for evaluating the data of the first object recognition device, for path planning and for controlling the first picker;
a buffering station on which the first picker places the workpieces after the removal from the bin, with an intermediate station comprising a turntable that transports the workpieces from a placement region into a removal region;
a positioning apparatus that positions and/or isolates the workpieces, starting from the buffering station; and
a second object recognition device for detecting the workpieces on the turntable, wherein
the second object recognition device is arranged above the turntable such that, on a movement from the placement region into a removal region, a workpiece moves into a detection region where it is detected by the second object recognition device before it is moved further toward the removal region by rotation of the turntable,
wherein the turntable has at least three placement areas; wherein, whenever a first placement area is arranged in the placement region, a second placement area is located in the detection region and a third placement area is located in the removal region; and wherein a placing of a first workpiece on the turntable by the first picker, a detection of a second workpiece on the turntable by the second object recognition device, and a picking back up again of a third workpiece form the turntable by the positioning apparatus takes place.

12. The apparatus in accordance with claim 11, wherein the turntable works in a cycled manner and has at least three rotational positions; wherein a first placement area of the turntable is arranged in the placement region in the first rotational position, in the detection region in the second rotational position, and in the removal region in the third rotational position; and wherein the placement of a workpiece on the turntable by the first picker, the detection of the workpiece on the turntable by the second object recognition device, and the picking back up again of the workpiece from the turntable by the positioning apparatus respectively take place with a stationary turntable.

13. An apparatus for automated removal of workpieces arranged in a bin;
having a first object recognition device for detecting the workpieces in the bin;
a first picker for picking and removing the workpieces from the bin;
a controller for evaluating the data of the first object recognition device, for path planning and for controlling the first picker;
a buffering station on which the first picker places the workpieces after the removal from the bin, with an intermediate station comprising a transport device that transports the workpieces from a placement region into a removal region;
a positioning apparatus that positions and/or isolates the workpieces, starting from the buffering station; and
a second object recognition device for detecting the workpieces on the transport device,
wherein
the second object recognition device has a light source for illuminating the workpiece, with the second object recognition device having a casing that reduces incidence of scattered light onto the workpiece from the outside.

14. The apparatus in accordance with claim 13, wherein the first object recognition device comprises a 3D sensor and the second object recognition device comprises a 2D sensor.

15. The apparatus in accordance with claim 13, wherein the casing extends from a sensor that is arranged at a first spacing from a placement area of the transport device toward the transport device; wherein a supply and discharge region that permits the supply and discharge of the workpieces on the transport device into the region of the casing remains open between the casing and the placement area of the transport device; with the casing in the supply and discharge region ending at a second spacing from the placement area of the transport device; and wherein the second spacing amounts to less than 50% of the first spacing.

16. The apparatus in accordance with claim 15, wherein the second spacing amounts to less than 20% of the first spacing.

17. An apparatus for automated removal of workpieces arranged in a bin,
having a first object recognition device for detecting the workpieces in the bin;
a controller for evaluating data of the first object recognition device, for path planning and for controlling a first picker;
a buffering station on which the first picker places the workpieces after the removal from the bin, wherein the buffering station comprises:
at least one tiltable placement area that is tiltable into a slanted position via a tilting mechanism and
a transport device that transports the workpieces from a placement region to a removal region where the workpieces are positioned and/or isolated by a positioning apparatus; and
the positioning apparatus that positions and/or isolates the workpieces, starting from the buffering station, wherein
the positioning apparatus comprises a second picker for removing the workpieces from the buffering station; and/or
wherein the first and/or second pickers is/are moved by a picker arm, with it being a robot arm of a 6-axis robot or a picker arm arranged at a surface portal or a linear portal; and/or
wherein a plurality of bins with workpieces are arranged in a working region of the first picker from which the first picker picks workpieces, with a supply arrangement having at least two supply regions arranged next to one another for bins being provided, with the first object recognition device being movable over each of the bins and/or supply regions by means of a travel arrangement, and/or with a separation apparatus being provided via which the supply regions are individually separated from the working region of the first picker, with a hood being provided that is moved over one of the bins and/or over one of the supply regions; and/or
wherein a plurality of different workpieces are handled next to one another.

* * * * *